United States Patent
Feucht et al.

(10) Patent No.: US 7,171,298 B2
(45) Date of Patent: Jan. 30, 2007

(54) METHOD AND SYSTEM FOR IDENTIFYING PHASE IN AN INTERNAL COMBUSTION ENGINE

(75) Inventors: Gregory A. Feucht, Shanghai (CN); Alan J. Chewter, Whitmore Lake, MI (US); Marvin L. Lynch, Detroit, MI (US); Matthew H. Henry, Charlottesville, VA (US); Christopher D. DeSalvo, Buffalo Grove, IL (US); Robert W. Deutsch, Sugar Grove, IL (US)

(73) Assignee: Temic Automotive of North America, Inc., Deer Park, IL (US)

( * ) Notice: Subject to any disclaimer, the term of this patent is extended or adjusted under 35 U.S.C. 154(b) by 0 days.

(21) Appl. No.: 11/170,891

(22) Filed: Jun. 30, 2005

(65) Prior Publication Data
US 2007/0005223 A1 Jan. 4, 2007

(51) Int. Cl.
G06F 19/00 (2006.01)
G01M 15/00 (2006.01)

(52) U.S. Cl. .................................... 701/101; 73/117.3

(58) Field of Classification Search ........... 123/406.18, 123/406.53, 406.59–406.63, 435, 436, 479, 123/672–674, 679; 701/101–105, 109–112, 701/114, 115; 73/116, 117.3; 324/207.25
See application file for complete search history.

(56) References Cited

U.S. PATENT DOCUMENTS

| 5,377,535 | A  | * | 1/1995 | Angermaier et al. ......... 73/116 |
| 5,970,784 | A  | * | 10/1999 | Genin ....................... 73/117.3 |
| 6,170,462 | B1 | * | 1/2001 | Kondo .................. 123/406.18 |
| 6,244,248 | B1 |   | 6/2001 | Halleron et al. |
| 6,273,075 | B1 | * | 8/2001 | Choi et al. .................. 123/673 |

FOREIGN PATENT DOCUMENTS

JP 05263699 A * 10/1993 ................. 701/104

* cited by examiner

*Primary Examiner*—Willis R. Wolfe, Jr.
(74) *Attorney, Agent, or Firm*—Thomas V. Miller; Terri S. Hughes; Gary J. Cunningham (57) ABSTRACT

A method and system for identifying a phase in an internal combustion engine (102) is disclosed. The internal combustion engine may include an even number of cylinders and is fitted with at least one sensor. In one embodiment, the method includes measuring a state of the internal combustion engine using the at least one sensor. The method may further include calculating a deviation of the state from an expected set of values, and determining the phase of the internal combustion engine, based on the deviation.

19 Claims, 7 Drawing Sheets

METHOD AND SYSTEM FOR IDENTIFYING PHASE IN AN INTERNAL COMBUSTION ENGINE

FIELD OF THE INVENTION

This invention relates in general to internal combustion engines, and more specifically, to a method and system for identifying the phase in an internal combustion engine.

BACKGROUND

In an internal combustion engine, major aspects of modern engine control require knowledge of the engine position within the 720 degree crankshaft rotation that makes up the four-stroke cycle, e.g. individual cylinder control, spark, or knock control. Therefore, it is important to identify the phase of an internal combustion engine. Identifying phase is also important for the enhanced performance of and improved emissions from internal combustion engines. To achieve this, synchronization is required in fuel injectors in diesel engines. Synchronization is also required in spark plugs in petrol engines. This synchronization of diesel or petrol engines requires information of the current phase of cylinders in internal combustion engines.

In a known method, a pair of sensors is employed to identify the phase of an internal combustion engine. A crank sensor and a cam sensor are mounted on the crankshaft and the camshaft, respectively. The crank sensor determines the crank angle with respect to the top dead center of a cylinder in the internal combustion engine. The cam sensor differentiates between the intake and power strokes of the internal combustion engine. The combination of the crank sensor and cam sensor identifies the phase of the internal combustion engine. However, installing two sensors adds cost and complexity to the internal combustion engine assembly.

In another known method, a single cam sensor is mounted on the camshaft, which can determine both crank angle and phase of the internal combustion engine. Since a camshaft rotates at half the speed of the crankshaft, the cam sensor can differentiate between the intake and power stroke of an internal combustion engine and identify the phase of the internal combustion engine. However, the single cam sensor is expensive and less accurate.

BRIEF DESCRIPTION OF THE DRAWINGS

The present invention is illustrated by way of example and not limitation in the accompanying figures, in which like references indicate similar elements, and in which.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

In an embodiment of the invention, a method for identifying phase of an internal combustion engine with even number of cylinders is disclosed. A state of the internal combustion engine is measured by using at least one sensor. Thereafter, a deviation of the state from an expected set of values is calculated. The phase of the internal combustion engine is determined, based on the deviation.

In another embodiment of the invention, an automotive control system for controlling an internal combustion engine with an even number of cylinders is disclosed. The automotive control system has means for measuring a state of the internal combustion engine. A means for calculating the deviation calculates a deviation of the state from an expected set of values. Based on the deviation a means for determining determines the phase of the internal combustion engine.

Before describing in detail the method and system for identifying phase in an internal combustion engine in accordance with the present invention, it should be observed that the present invention resides primarily in combinations of method steps and apparatus components related to identifying phase in an internal combustion engine. Accordingly, the apparatus components and method steps have been represented where appropriate by conventional symbols in the drawings, showing only those specific details that are pertinent to understanding the present invention so as not to obscure the disclosure with details that will be readily apparent to those of ordinary skill in the art having the benefit of the description herein.

A "set" as used in this document, means a non-empty set (i.e., comprising at least one member). The term "another", as used herein, is defined as at least a second or more. The terms "including" and/or "having", as used herein, are defined as comprising.

Figure 1:
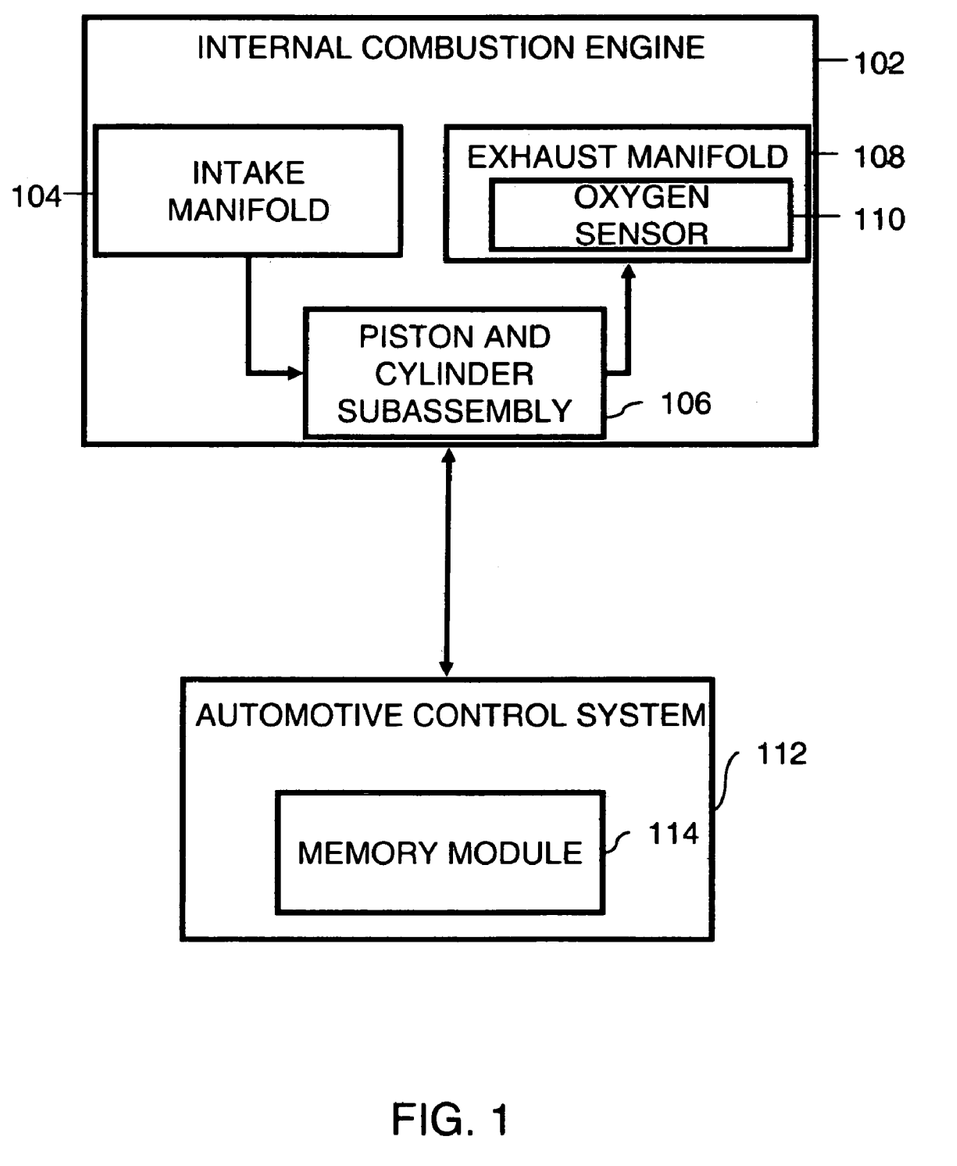
FIG. 1 is a block diagram illustrating an internal combustion engine, in accordance with an exemplary embodiment of the invention.

Referring to FIG. 1, a block diagram illustrates an internal combustion engine 102, in accordance with an exemplary embodiment of the invention. The internal combustion engine 102 includes an intake manifold 104, a piston-cylinder assembly 106 and an exhaust manifold 108. The intake manifold 104 is a passage for transporting air-fuel mixture into the piston-cylinder assembly 106. The piston-cylinder assembly 106 expels gases, produced due to the combustion of the air-fuel mixture, into the exhaust manifold 108. The gases entering the exhaust manifold 108 are referred to as exhaust gases. An oxygen sensor 110 is fitted in the exhaust manifold 108. The oxygen sensor 110 measures the proportion of oxygen in the exhaust gases entering the exhaust manifold 108. The time elapsed between injecting the air-fuel mixture and sensing the exhaust gases, by the oxygen sensor 110, is referred to as a transport delay. The oxygen sensor 110 senses the proportion of oxygen present in the exhaust gases and generates a voltage signal. The voltage signal is proportionate to the to the quantity of oxygen present in the exhaust gases. If the exhaust gases have a high proportion of oxygen, the oxygen sensor 110 generates a voltage signal that is less than a predetermined level (for example, less than 0.45 Volts). If the exhaust gases have a low proportion of oxygen, the oxygen sensor 110 generates a voltage signal that is greater than the predetermined level (for example, greater than 0.45 Volts). The voltage signal generated by the oxygen sensor 110 is received by an automotive control system 112.

The automotive control system 112 receives and transmits electrical signals. Data storage, signal modulation, and computational procedures performed by the present invention may be carried out by the automotive control system 112 utilizing conventional circuit elements, such as a central processing unit, random access memory registers, read only memory registers, and the like.

In one embodiment of the invention, the automotive control system 112 interprets a voltage signal that is less than the predetermined limit (e.g., 0.45 Volts) as indicative of a lean air-fuel mixture, and a voltage signal that is more than the predetermined limit (e.g., 0.45 Volts) as indicative of a rich air-fuel mixture. Thereafter, the automotive control system 112 regulates the air-fuel mixture, based on the voltage signal. If the automotive control system 112 interprets a lean air-fuel mixture, it decreases the air-fuel ratio. In other words, the air-fuel mixture is made rich, so that it has more fuel for every part of air present in the air-fuel mixture. In one embodiment of the invention, an optimal air-fuel mixture has an air-fuel ratio of 14.7:1. Exhaust gases produced on combustion of rich air-fuel mixture contains a lower proportion of oxygen than that produced by the combustion of a lean air-fuel mixture. This causes the oxygen sensor 110 to switch from a voltage signal value of less than the predetermined limit (e.g., 0.45 Volts) to one that is greater than the predetermined limit (e.g., 0.45 Volts). This is referred to as a lean-rich switch. Similarly, if the automotive control system 112 changes the air-fuel mixture from rich to lean, the oxygen sensor 110 switches from a voltage signal value that is greater than the predetermined limit (e.g., 0.45 Volts) to a voltage signal value that is less than the predetermined limit (e.g., 0.45 Volts). This is referred to as a rich-lean switch. The time taken by the oxygen sensor 110 to respond to a change in fueling depends on the transport delay. For example, if the air-fuel mixture is injected at the combustion stroke instead of the intake stroke the transport delay value would increase and hence the time between the lean-rich or rich-lean switch will also increase. Further, the automotive control system 112 controls the timing of spark ignition in petrol engines. The automotive control system 112 further receives signals from at least one sensor fitted in the internal combustion engine 102. This sensor may be, for example, but not limited to, an engine coolant temperature (ECT) sensor, and a crankshaft sensor for sensing rotation per minute (RPM) of the internal combustion engine 102. Further, the automotive control system 112 includes a memory module 114 that stores an expected set of values of the parameters of the internal combustion engine 102.

Figure 2:
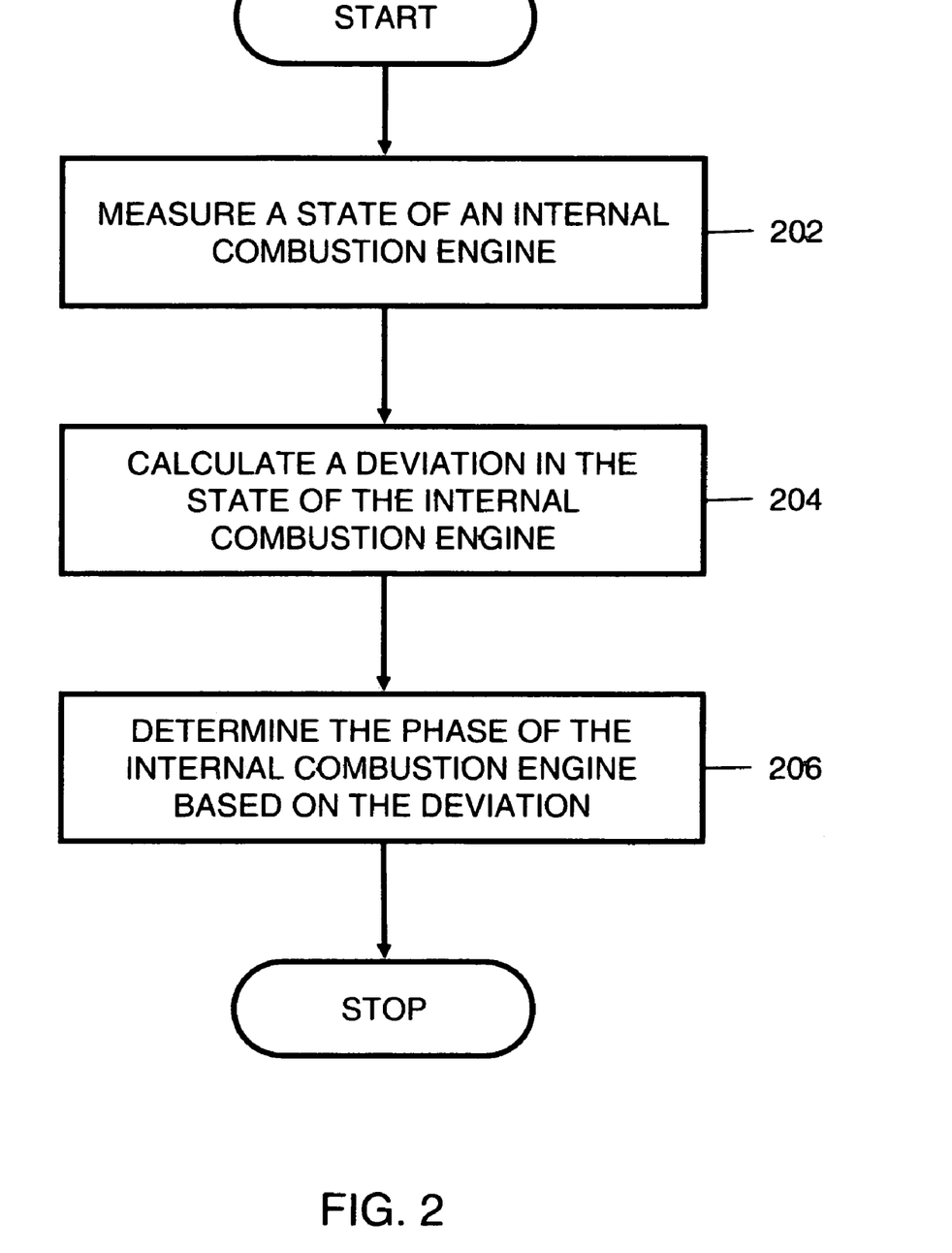
FIG. 2 is a flowchart illustrating a method for identifying phase in an internal combustion engine, in accordance with an exemplary embodiment of the invention.

Referring to FIG. 2, a flowchart illustrates a method for identifying phase in an internal combustion engine, in accordance with an exemplary embodiment of the present invention. At step 202, a state of the internal combustion engine 102 is measured. In one embodiment of the invention, the state of the internal combustion engine 102 refers to the time between a lean-rich and a rich-lean switch of the oxygen sensor 110, and vice versa. The time between the two consecutive switches of the oxygen sensor 110 is referred to as a phase period. In an embodiment of the invention, the phase period is called the switch period. The phase period is further explained in conjunction with FIG. 5.

At step 204, a deviation in the state of the internal combustion engine 102 from an expected set of values is calculated. In one embodiment of the invention, the expected set of values include the expected values of the phase period, corresponding to the different RPM values of the internal combustion engine 102. In another embodiment of the invention, the expected set of values is stored in look-up tables in the memory module 114. In another embodiment of the invention, the expected set of values include the expected in-phase state values and expected out-phase state values of the internal combustion engine 102. The expected in-phase state values include expected rich in-phase state values and expected lean in-phase state values. The expected rich in-phase state values are the expected values of the state of an internal combustion engine while it is running in-phase on a rich air-fuel mixture. The expected lean in-phase state values are the expected values of the state of an internal combustion engine while it is running in-phase on a lean air-fuel mixture. Similarly, the expected out-phase state values include expected rich out-phase state values and expected lean out-phase state values. The expected rich out-phase state values are the expected values of the state of an internal combustion engine while it is running out of phase on a rich air-fuel mixture. The expected lean out-phase state values are the expected values of the state of an internal combustion engine while it is running out of phase on a lean air-fuel mixture. In one embodiment of the invention, the expected rich in-phase state values, the expected lean in-phase state values, the expected rich out-phase state values, and the expected lean out-phase state values are stored in look-up tables in the memory module 114. In another embodiment of the invention, only the expected lean in-phase state values and expected lean out-phase state values are stored in the automotive control system 112. The expected rich in-phase state values may be calculated by multiplying the expected lean in-phase state values with a constant factor. Similarly, the expected rich out-phase state values may be calculated by multiplying the expected lean out-phase state values with a constant factor.

At step 206, the phase of the internal combustion engine 102 is determined. The determination whether the internal combustion engine 102 is running in-phase or out of phase is made based on the deviation of the phase period from the expected set of values.

Figure 3:
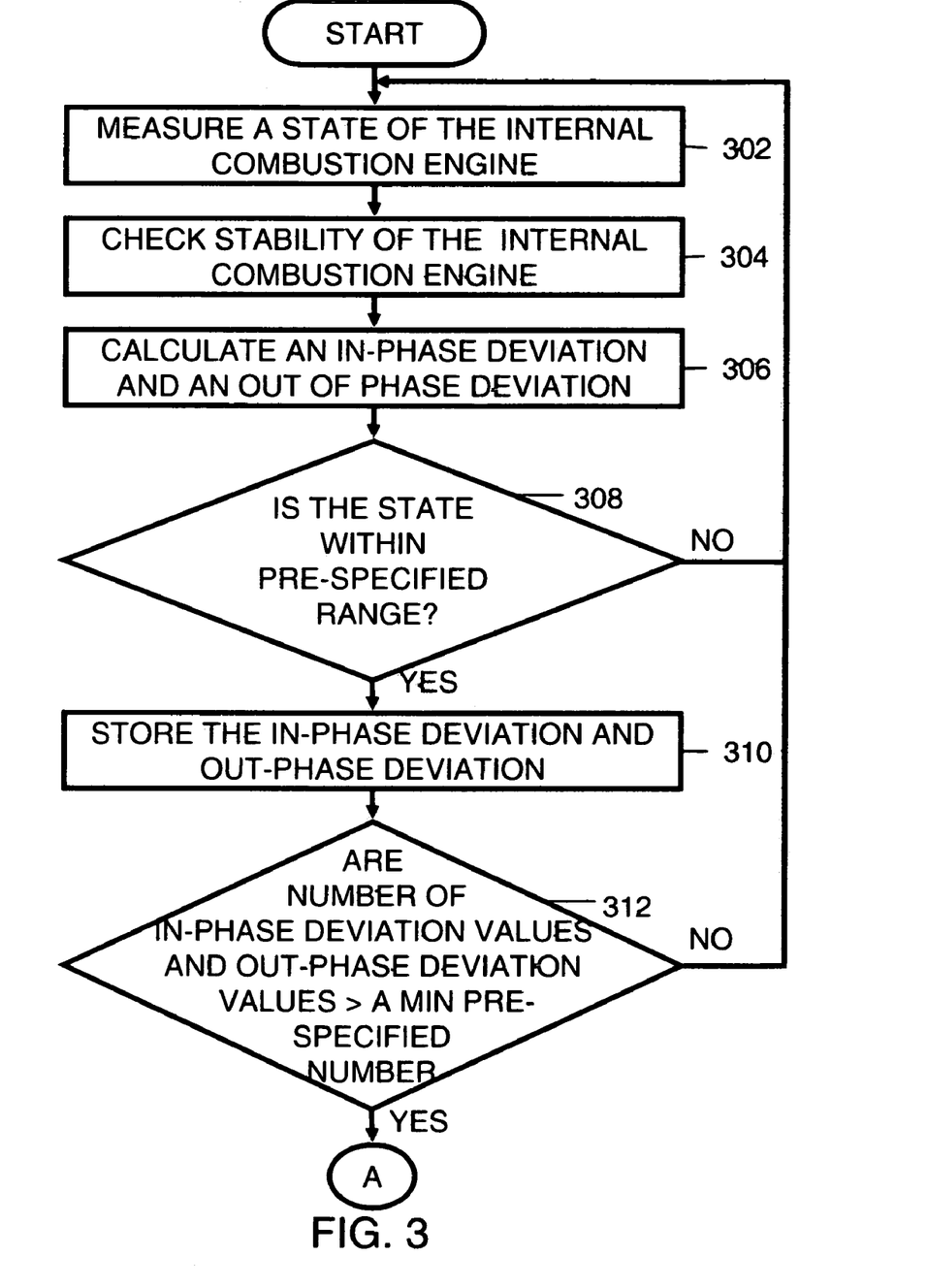
FIGS. 3 and 4 illustrate another method for identifying phase in an internal combustion engine, in accordance with an exemplary embodiment of the invention.
Figure 4:
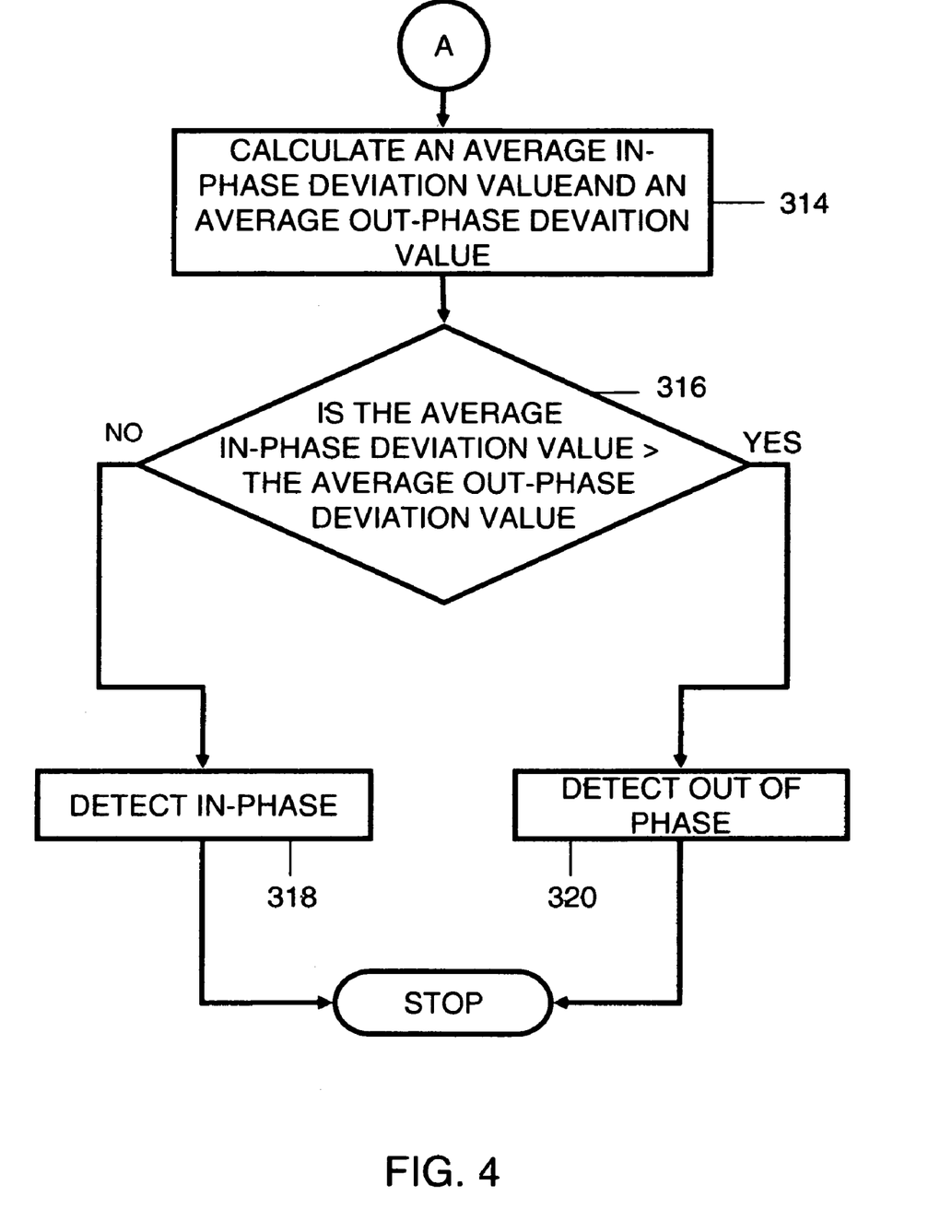

Referring to FIGS. 3 and 4, a flowchart illustrates a method for identifying phase in an internal combustion engine, in accordance with another exemplary embodiment of the present invention. At step 302, a state of the internal combustion engine 102 is measured. In one embodiment of the invention, the state of the internal combustion engine 102 refers to the phase period as described in conjunction with FIG. 2. At step 304, the stability of the internal combustion engine 102 is checked, based on a stability criterion. In one embodiment of the invention, the stability criterion is a function of different parameters of the internal combustion engine 102, such as the throttle position, manifold absolute pressure (MAP), RPM, and the engine coolant temperature (ECT). Each time a switch in the voltage signal value generated by the oxygen sensor 110 from (N−1)th instance to Nth instance occurs, the difference between the values of each of the throttle positions, the MAP, the RPM and the ECT for the Nth instance and the (N−1)th instance, is calculated. If the calculated difference of each of the parameters is less than an expected value of difference, corresponding to each parameter, the internal combustion engine 102 is considered to be stable. Otherwise, the value of the phase period, while switching from the (N−1)th instance to the Nth instance, is discarded.

At step 306, an in-phase deviation value and an out-phase deviation value of the phase period is calculated, based on the expected set of values. The in-phase deviation and out-phase deviation values are the deviation of the phase period from the expected set of values. In one embodiment, the in-phase deviation value is calculated by comparing the value of the phase period with an expected rich in-phase state value corresponding to the RPM of the internal combustion engine 102 during the phase period, if the oxygen sensor had made a lean-rich switch. Otherwise, the in-phase deviation value may be calculated by comparing the value of the phase period with an expected lean in-phase state value corresponding to the RPM of the internal combustion engine 102 during the phase period. Similarly, the out-phase deviation value may be calculated by comparing the value of the phase period with an expected rich out-phase state value corresponding to the RPM of the internal combustion engine 102 during the phase period, if the oxygen sensor had made a lean-rich switch. Otherwise, the out-phase deviation may be calculated from an expected lean out-phase state value corresponding to the RPM of the internal combustion engine 102 during the phase period. In one embodiment of the invention, the in-phase deviation and out-phase deviation values may be calculated as a percentage of the expected set of values. An exemplary formula for calculating the percentage in-phase deviation is as follows:

InPhaseDeviationValue=|PhasePeriod−ExpectedRichInPhaseStateValue|÷ExpectedRichInPhaseStateValue At step 308, the in-phase deviation value and the out-phase deviation value are checked for the outlier values of the state. If the magnitudes of at least one of the in-phase or out-phase deviation values is greater than a pre-specified threshold value, the in-phase deviation and out-phase deviation values are discarded. The pre-specified threshold value is called the phase outlier threshold. At step 310, the in-phase deviation and out-phase deviation values that are less than the phase outlier threshold are stored in the memory module 114.

At step 312, the number of in-phase deviation and out-phase deviation values stored in the memory module 114 is compared to a pre-determined number. If the number of in-phase deviation and out-phase deviation values stored is more than the pre-determined number, an average in-phase deviation value and an average out phase deviation value are calculated at step 314.

In one embodiment of the invention, the average in-phase and out-phase deviation values are calculated on the basis of the average of a pre-determined number of in-phase and out-phase deviation values, respectively. In another embodiment of the invention, phase weights are assigned to each of the measured phase periods. Phase weights are calculated by multiplying the weights associated with certain parameters of the internal combustion engine 102, such as RPM, ECT, a phase start time (PST), etc. Weights are assigned to the parameters of the internal combustion engine 102, so that a higher weight is assigned to a stable engine state. For example, a higher phase weight is assigned to an engine state that is measured 20 seconds after the internal combustion engine 102 is started, as compared to an engine state that is measured 10 seconds after the internal combustion engine 102 is started. The phase weights assigned to each of the phase periods are combined, to generate a cumulative phase weight. If the cumulative phase weight exceeds a pre-specified value, the average in-phase and out-phase deviation values are calculated. Table 1 shows exemplary values of phase weights in accordance with an embodiment of the invention. As an example, if the pre-specified value of cumulative phase weight is 8.0, then the following quantity of data points would be necessary and sufficient to calculate the average deviation values:

TABLE 1

| Event (Number) N | Frequency (Hz) PHASE IN $DEV_N$ | Frequency (Hz) PHASE OUT $DEV_N$ | Weighting %/100 PHASE $WEIGHT_N$ |
| --- | --- | --- | --- |
| 1 | 0.33 | 0.16 | 0.88 |
| 2 | 0.21 | 0.03 | 1.12 |
| 3 | 0.4 | 0.15 | 1.05 |
| 4 | 0.18 | 0.06 | 1.31 |
| 5 | 0.22 | 0.12 | 1.33 |
| 6 | 0.28 | −0.05 | 1.44 |
| 7 | 0.16 | 0.05 | 1.46 |
| | CUM_PHASE_WEIGHT | | 8.59 |

PHASE IN DEV AVG A .254
PHASE OUT DEV AVG B .074

In this case the weighted sum of events is 8.59, which is greater than the pre-specified value of cumulative phase weight (8).

At step 316, the average in-phase deviation value is compared to the average out-phase deviation value. At step 318, the internal combustion engine 102 is determined to be in-phase if the average in-phase deviation value is less than the average out-phase deviation value. At step 320, the internal combustion engine 102 is determined to be out of phase if the average out-phase deviation value is less than the average in-phase deviation value.

In one embodiment of the invention, the state of the internal combustion engine 102 is determined a number of times. If the majority of the number of times the determination is made is in-phase, the internal combustion engine 102 is determined to be in-phase; otherwise, it is determined to be out of phase.

Figure 5:
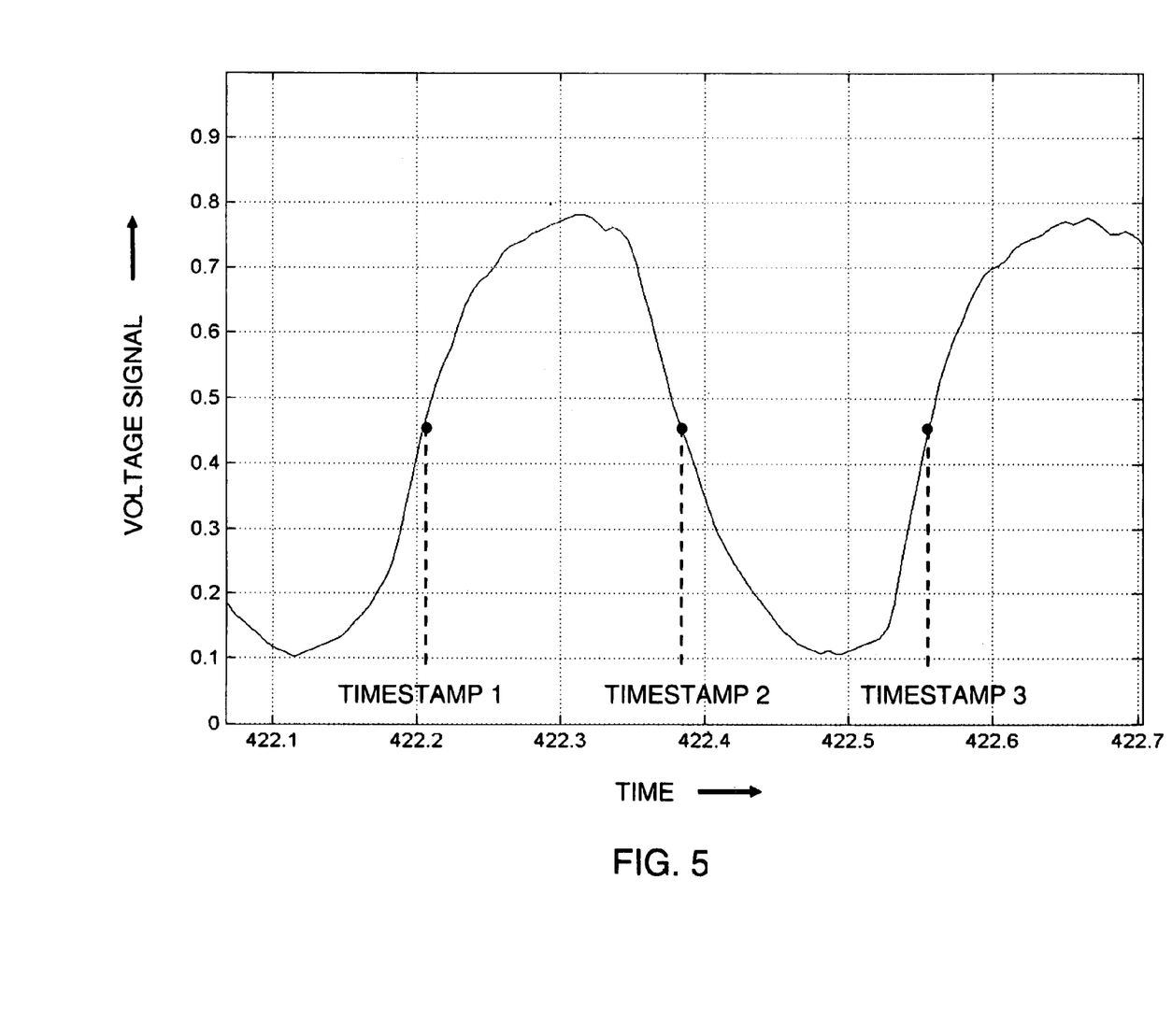
FIG. 5 illustrates a variation in the output of an oxygen sensor over a period, in accordance with an exemplary embodiment of the invention.

Referring to FIG. 5, a graph illustrates a variation in the output of an oxygen sensor 110 over a period, in accordance with an exemplary embodiment of the present invention. The graph indicates the time taken for a rich-lean switch, which is the time between timestamp 1 and timestamp 2; and the time taken for a lean-rich switch, which is the time taken between timestamp 2 and timestamp 3. The time that has elapsed between timestamp 1 and timestamp 2 is a phase period corresponding to a rich-lean switch. The time that has elapsed between timestamp 2 and timestamp 3 is a phase period corresponding to a lean-rich switch.

Figure 6:
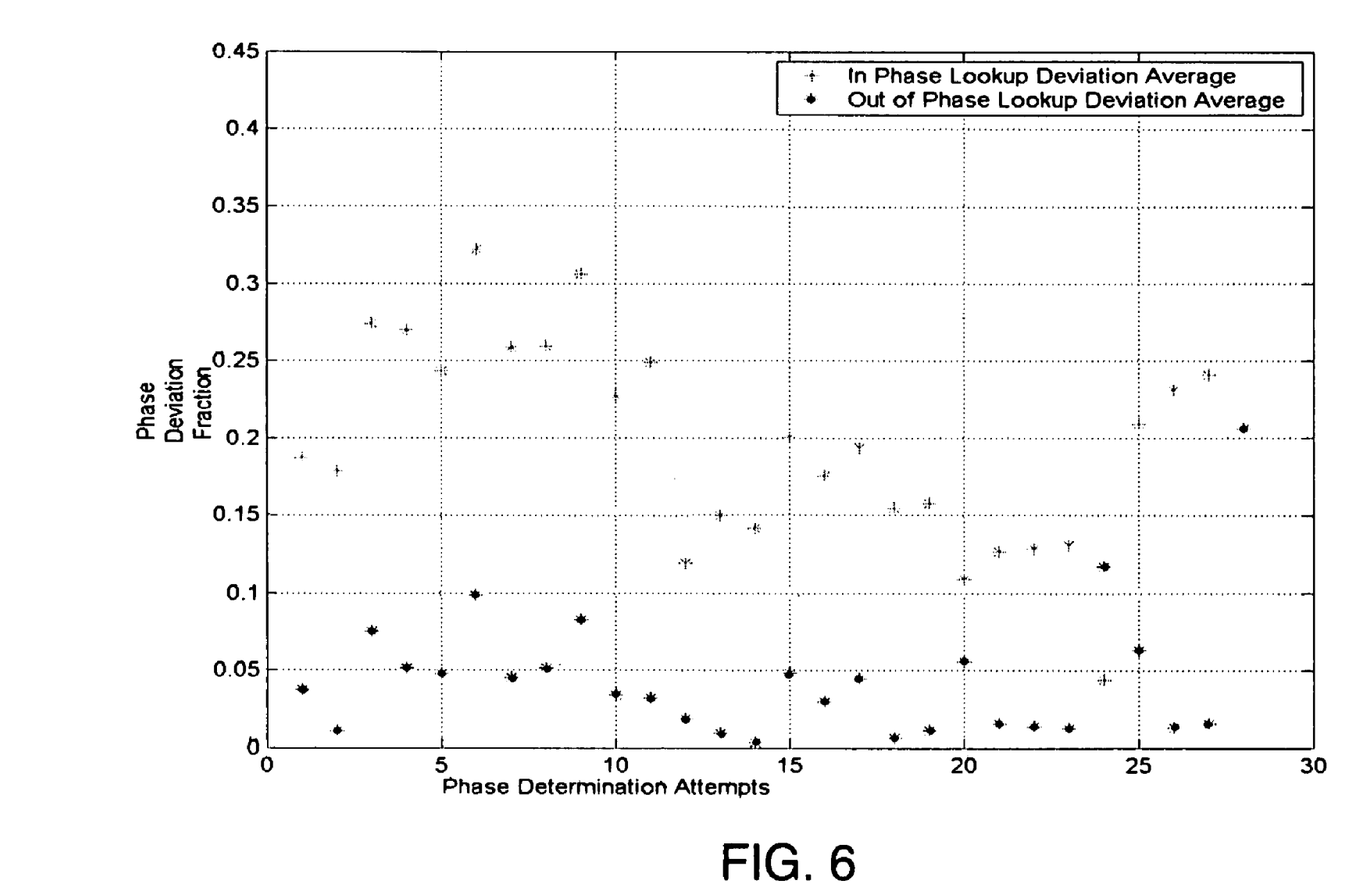
FIG. 6 is an exemplary graph illustrating different phase determination attempts, in accordance with an exemplary embodiment of the invention.

Referring to FIG. 6, an exemplary graph illustrates different phase determination attempts, in accordance with an exemplary embodiment of the present invention. The graph shows the number of phase determination attempts on the X-axis, and the average in-phase and out-phase deviation values on the Y-axis. The gray dots on the graph indicate the average in-phase deviation values, and the black dots on the graph indicate the average out-phase deviation values. Since the first 23 average out-phase deviation values are less than the corresponding average in-phase deviation values, the determination is out of phase. Further, since the determination made from the majority of the 28 sets of the average deviation values is out of phase, the internal combustion engine 102 is also identified to be running out of phase. Each set of average deviation values include an average in-phase and an average out-phase deviation values.

Figure 7:
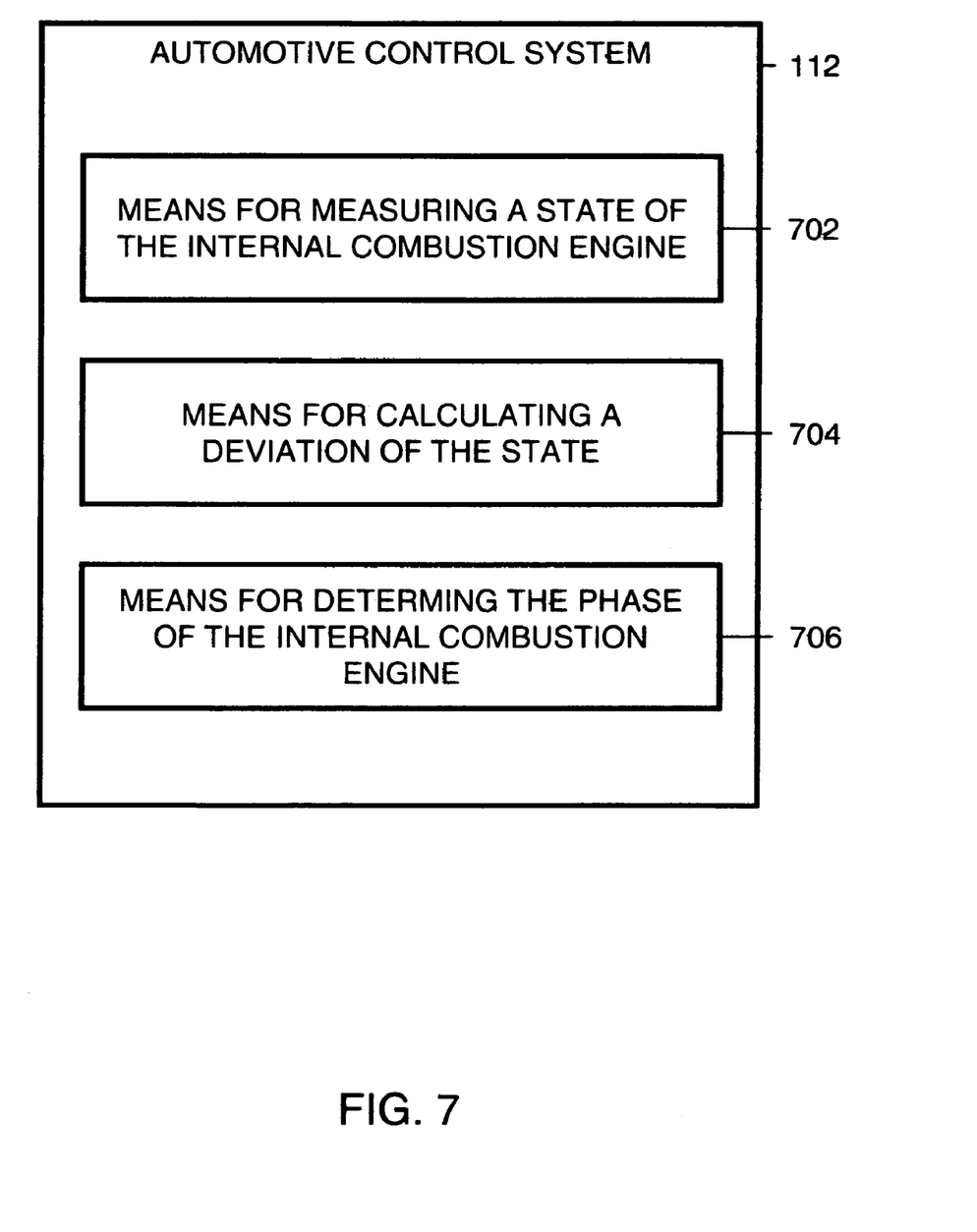
FIG. 7 is a block diagram illustrating an automotive control system, in accordance with an exemplary embodiment of the invention.

Referring to FIG. 7, a block diagram illustrates an automotive control system 112, in accordance with an exemplary embodiment of the present invention. The automotive control system 112 includes a means for measuring 702, a means for calculating 704, and a means for determining 706. The means for measuring 702 measures the state of the internal combustion engine 102, based on the output of the at least one sensor fitted to the internal combustion engine 102. The at least one sensor provides signals which are proportionate to one or more parameters of the internal combustion engine 102, to the means for measuring 702. In an embodiment of the invention, the means for measuring 702 measures the time between two consequent signals, or the phase period, generated by the oxygen sensor 110. In another embodiment of the invention, the stability of the internal combustion engine 102 is checked by a means for checking stability. The means for checking stability calculates the difference between the throttle position, the MAP, the RPM and the ECT of the internal combustion engine 102 for two consequent switches of the oxygen sensor 110. Further, a means for calculating 704 calculates a deviation of the phase period from an expected set of values.

In an embodiment of the invention, the means for calculating 704 calculates at least one in-phase deviation value, at least one out-phase deviation value, an average in-phase deviation value, and an average out-phase deviation value. In another embodiment of the invention, the means for calculating 704 further includes a means for storing the at least one in-phase deviation value and the at least one out-phase deviation value, a means for storing the average in-phase deviation value and the average out-phase deviation values, and a means for checking whether the number of the at least one in-phase deviation value and the at least one out-phase deviation value is more than a predetermined number.

Based on the average in-phase and the average out-phase deviation values, the means for determining 706 determines the phase of the internal combustion engine 102. In an embodiment of the invention, the means for determining 706 includes a means for comparing, which compares the average in-phase deviation with the average out-phase deviation.

One or more embodiments of the invention as described above have an advantage of identifying the phase of an internal combustion engine without using a cam sensor. Another advantage of the invention is using the data from existing sensors in a vehicle to identify the phase of an internal combustion engine using a different method.

In the foregoing specification, the invention and its benefits and advantages have been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for identifying a phase in an internal combustion engine, the internal combustion engine comprising an even number of cylinders and fitted with at least one sensor, the method comprising:
   measuring a state of the internal combustion engine using the at least one sensor;
   calculating a deviation in the state from an expected set of values, wherein the expected set of values comprises a plurality of expected in-phase state values and a plurality of expected out-phase state values; and
   determining the phase of the internal combustion engine based on the deviation.

2. The method according to claim 1 further comprising:
   checking stability of the internal combustion engine based on at least one stability criterion.

3. The method according to claim 1 further comprising:
   checking for outlier values of the state, the outlier values being values lying outside a pre-specified range.

4. The method according to claim 1, wherein determining the phase comprises:
   comparing an average in-phase deviation value with an average out-phase deviation value.

5. A method for identifying a phase in an internal combustion engine, the internal combustion engine comprising an even number of cylinders and fitted with at least one sensor, the method comprising:
   measuring a state of the internal combustion engine using the at least one sensor;
   calculating a deviation in the state from an expected set of values, wherein calculating the deviation comprises:
     calculating at least one in-phase deviation value,
     calculating at least one out-phase deviation value,
     checking whether a number of the at least one in-phase deviation value and the at least one out-phase deviation value is more than a predetermined number,
     calculating an average in-phase deviation value, and
     calculating an average out-phase deviation value; and
   determining the phase of the internal combustion engine based on the deviation.

6. The method according to claim 5, wherein calculating the deviation further comprises:
   storing the at least one in-phase deviation value and the at least one out-phase deviation value; and
   storing the average in-phase deviation value and the average out-phase deviation value.

7. The method according to claim 5, wherein calculating the deviation further comprises:
   calculating a phase weight for the at least one in-phase deviation value and the at least one out-phase deviation value.

8. An automotive control system, the automotive control system controlling an internal combustion engine, the internal combustion engine comprising an even number of cylinders, the automotive control system comprising:
   means for measuring a state of the internal combustion engine;
   means for calculating a deviation in the state from an expected set of values, wherein the means for calculating the deviation comprises means for calculating at least one in-phase deviation value, at least one out-phase deviation value, an average in-phase deviation value, and an average out-phase deviation value; and
   means for determining a phase of the internal combustion engine based on the deviation.

9. The system according to claim 8, wherein the means for calculating the deviation further comprises:

means for checking whether a number of the at least one in-phase deviation value and the at least one out-phase deviation value is more than a predetermined number of values.

10. The system according to claim 8, wherein the means for calculating the deviation further comprises:
means for storing the at least one in-phase deviation value and the at least one out-phase deviation value; and
means for storing the average in-phase deviation value and the average out-phase deviation value.

11. The system according to claim 8, wherein the means for calculating the deviation further comprises:
means for calculating a phase weight for the at least one in-phase deviation value and the at least one out-phase deviation value.

12. An automotive control system, the automotive control system controlling an internal combustion engine, the internal combustion engine comprising an even number of cylinders, the automotive control system comprising:
means for measuring a state of the internal combustion engine;
means for calculating a deviation in the state from an expected set of values, wherein the expected set of values comprises a plurality of expected in-phase state values and a plurality of expected out-phase state values; and
means for determining a phase of the internal combustion engine based on the deviation.

13. The system according to claim 12 further comprising:
means for checking stability of the internal combustion engine based on at least one stability criterion.

14. The system according to claim 12 further comprising:
means for checking outlier values of the state, the outlier values being values lying outside a pre-specified range.

15. The system according to claim 12, wherein the plurality of expected in-phase state values comprise at least one expected lean in-phase state value and at least one expected rich in-phase state value.

16. The system according to claim 12, wherein the plurality of expected out-phase state values comprise at least one expected lean out-phase state value and at least one expected rich out-phase state value.

17. The system according to claim 12, wherein the means for determining the phase comprises:
means for comparing an average in-phase deviation value and an average out-phase deviation value.

18. The system according to claim 12, wherein the means for measuring the state comprises at least one of sensor.

19. The system according to claim 18, wherein the at least one sensor comprises an oxygen sensor.

* * * * *